United States Patent Office 2,899,435
Patented Aug. 11, 1959

---

2,899,435

5-NEOPENTYL 5-ALLYL BARBITURIC ACID AND SALTS THEREOF

Arne Elof Brandstrom, Uppsala, Sweden, assignor to Aktiebolaget Pharmacia, Uppsala, Sweden, a company of Sweden No Drawing. Application October 12, 1955
Serial No. 540,170

Claims priority, application Sweden October 14, 1954

1 Claim. (Cl. 260—257)

This invention relates to 5-neopentyl 5-allyl barbituric acid and salts thereof. More specifically, the invention relates to a process for producing substituted barbituric acids and salts thereof, wherein an aliphatic radical is substituted in the 5-position of the barbituric acid, the aliphatic group providing a quaternary carbon atom bonded to the 5-carbon of the barbituric acid.

Many barbituric acid derivatives have been prepared in the past, and many have proved to be useful hypnotics, sedatives, and antiepileptics. The influence of various substituents on the pharmacology of barbituric acid and its salts has been carefully investigated. The evidence gathered thus far indicates that the two substituents attached in the 5-position of the barbituric acid molecule are of critical importance in determining the pharmacological properties of the barbiturates.

An object of this invention is to provide a process for the production of improved barbituric acid derivatives and salts thereof which contain an aliphatic substituent in the 5-position, said substituent having an optimum amount of branching from a pharmacological point of view.

More specifically, it is an object of the invention to provide a process for the production of barbituric acids and salts thereof having an alkyl or alkenyl substituent in the 5-position, said substituent having a quaternary carbon atom bonded to the 5-carbon of the barbituric acid.

Another object of the invention is to provide novel and effective pharmaceuticals, particularly useful as sedatives, hypnotics and antiepileptics, in the form of barbituric acid derivatives and salts thereof characterized by having a tertiary alkyl substituent in the 5-position, with a quaternary carbon in the beta-position.

These and other objects of the invention are accomplished by a process in which a malonic ester or a cyano-acetic ester is reacted with a urea derivative. In this process, an ester is produced conforming to the general formula:

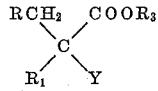

where: R is a tertiary alkyl radical containing at most 7 carbon atoms, $R_1$ may be hydrogen or an aliphatic group (alkyl or alkenyl) containing up to 4 carbon atoms, Y may be an ester group, such as $COOR_4$, where $R_4$ is an alkyl group preferably containing at most five carbon atoms, or, alternatively, Y may represent a cyano group, CN; $R_3$ is an alkyl group preferably containing at most 5 carbon atoms, and suitably, but not necessarily, identical with $R_4$.

The above defined compound is reacted with a urea compound having the formula:

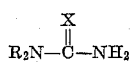

where: $R_2$ represents hydrogen or an aliphatic group (alkyl or alkenyl) containing at most 4 carbon atoms; X represents oxygen, sulfur, or NH, when the urea compound is a guanidine. The salts of the urea compound may be used rather than the urea compound itself. The reaction is desirably carried out in a solvent in the presence of a strongly basic catalyst. The recovered product is a salt, which may be hydrolyzed, if desired, to the acid. The acid may be represented by the following general formula:

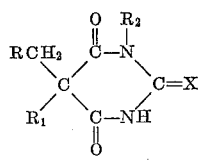

where the symbols R, $R_1$, $R_2$ and X have the significancies indicated above.

The malonic esters described above may be obtained according to the process described in my copending patent application, Serial No. 535,734, filed September 21, 1955.

The reaction which takes place where malonic esters are reacted may be depicted as follows:

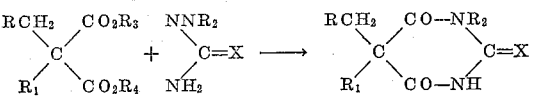

Where a cyano-acetic ester is reacted, a similar reaction mechanism is evident:

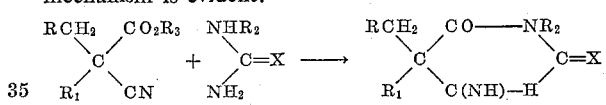

Boiling of the latter compound with hydrochloric acid converts the imide on the 6-carbon to a carboxyl group.

The reaction is desirably conducted in an alcoholic solvent, such as absolute methyl, ethyl, or isopropyl alcohol. However, other non-reactive organic solvents for the reactants may be advantageously employed. Any of the usual strongly basic catalysts can be used in the process but I prefer to use an alkali metal dissolved in the solvent or a caustic alkali.

The yield obtained is very good, generally, but tends to decrease as the lengths of the carbon chains in the substituents R and $R_1$, i.e. the substituents on the 5-carbon atom increase. This tendency is particularly pronounced where cyano esters are reacted, and satisfactory yields may be obtained in this case only where $R_1$ is hydrogen. Generally, superior yields are obtained when guanidine and its derivatives are reacted, than is the case with urea and its derivatives. To take advantage of the improved yield obtained with guanidine as a reactant, it is frequently desirable to condense the ester reactant with guanidine or a derivative thereof, and thereafter to hydrolyze the iminobarbituric acid product. This procedure is especially advantageous, for example, in the preparation of barbituric acid derivatives having an allyl group in the 5-position.

The alcohol radicals in the ester reactant, $R_3$ and $R_4$ have previously been indicated to be alkyl groups, containing at most 5 carbon atoms, preferably. However, during the reaction, where the solvent is an absolute alcohol, double displacement occurs with radicals of the alcoholic solvent interchanging with the alcoholic groups in the ester reactant. Therefore, the alcohol residues represented by $R_3$ and $R_4$ may be chosen substantially arbitrarily. Residues from lower alcohols containing no more than five carbon atoms are preferred because of their volatility and ease of removal. The choice is dependent, practically, on the availability of the particular malonic or cyano acetic esters.

The new compounds, produced according to the process of this invention, are particularly valuable as sedatives, hypnotics, soporifics and antiepileptics when taken in dosages conventional for known barbiturates. Particularly marked and desirable properties of this type are possessed by those barbituric acid derivatives where R is a tertiary butyl or tertiary amyl group, $R_1$ is an ethyl or allyl group and $R_2$ is a methyl group or hydrogen. For example, 5-allyl-5-neopentylbarbituric acid in low dosages is an excellent sedative and in higher dosages, has excellent hypnotic properties. This particular compound produces a very low frequency of undesired side effects in man. 1-methyl-5-allyl-neopentylbarbituric acid has similar properties, but its effects are of shorter duration. For some applications, this is of great value.

The process of the invention may be explained in greater detail by reference to the following specific examples which represent practical embodiments of my process.

*Example 1.—Neopentyl barbituric acid*

55 g. of sodium are dissolved in 1100 ml. of absolute methanol in a 3 liter, three-necked flask provided with a stirrer, a reflux condenser and a stopper. 75.5 g. of dried urea and 230 g. of neopentyl malonic acid diethyl ester are added thereto. The mixture is boiled for 6 hours, then the methanol is distilled off as completely as possible on an oil bath, the temperature of which should not exceed 120° C. At the end of the distillation, the pressure is reduced. The contents of the flask are dissolved in water and the solution, after cooling is extracted with benzene to remove water-insoluble oil products, after which the water-layer is acidified with concentrated hydrochloric acid while cooling and stirring. The precipitated neopentyl barbituric acid is filtered off, washed with water and then with alcohol, and dried in a drying oven at 80° C. to constant weight. The yield is 145-150 g. of a white, very loose powder, which sublimes on heating to above 200° C. This product is very difficultly soluble in the common organic solvents.

Corresponding yields were obtained when the corresponding dimethyl, dipropyl, dibutyl and diamyl esters were substituted in equivalent amounts for the neopentyl malonic acid diethyl etser employed above. While hexyl and higher esters can be used, the higher temperatures required to remove the alcohol formed in the reaction make the use of lower carbon alcohols preferable. Similarly, branched chain alcohols boil at a lower temperature than normal alchols, so that frequently the branched chain alcohol esters are preferred, i.e. isopropyl esters are employed in preference to n-propyl esters.

*Example 2.—5-neopentyl-4-iminobarbituric acid*

The procedure used in Example 1 is repeated, except that the neopentylmalonic acid diethyl ester is replaced by 183 g. of neopentylcyanoacetic acid ethyl ester (or the corresponding amount of the methyl, propyl, or butyl ester). 150 g. 5-neopentyl-4-iminobarbituric acid are obtained as a loose, difficultly soluble powder.

*Example 3.—5-neopentyl-2-iminobarbituric acid*

If in Example 1 the urea is replaced by 144 g. of guanidine carbonate, or an equivalent amount of another guanidine salt, such as the chloride or sulfate and the amount of sodium is increased to 82.8 g., 160 g. of 5-neopentyl-2-iminobarbituric acid are obtained.

*Example 4.—5-neopentyl-2,4-diiminobarbituric acid*

If, in Example 3, the neopentylmalonic acid diethyl ester is replaced by 183 g. of neopentylcyanoacetic acid ethyl ester, 150 g. of 5-neopentyl-2,4-diiminobarbituric acid are obtained. This acid, as well as the iminobarbituric acids mentioned in Examples 2 and 3, may be converted to 5-neopentylbarbituric acid by boiling for 12 hours with concentrated hydrochloric acid.

*Example 5.—1-methyl-5-neopentylbarbituric acid*

If in Example 1 the urea is replaced by 75 g. of methyl urea, 140 g. of 1-methyl-5-neopentylbarbituric acid, B.P. 144° C. are obtained after recrystallization from 50% methanol.

*Example 5A.—1-methyl-5-allyl-5-neopentyl barbituric acid*

If in Example 1 the urea is replaced with an equivalent of methyl urea and the neopentyl malonic acid diethyl ester is replaced by an equivalent of allyl-neopentyl malonic acid diethyl ester, 1-methyl-5-allyl-5-neopentyl barbituric acid is obtained, B.P. 136-137° C. Yield as in Example 5.

*Example 6.—5-methyl-5-neopentylbarbituric acid*

If in Example 1 the neopentylmalonic acid diethyl ester is replaced by 244 g. of methyl-neopentylmalonic ester, 147 g. of 5-methyl-5-neopentylbarbituric acid, B.P. 238° C. are obtained after recrystallization from 95% alcohol.

*Example 7.—5-ethyl-5-neopentylbarbituric acid*

If in Example 1 the neopentylmalonic acid diethyl ester is replaced by ethyl-neopentylmalonic acid diethyl ester, 140 g. of 5-ethyl-5-neopentylbarbituric acid, B.P. 195° C., are obtained after recrystallization from 50% alcohol.

*Example 8.—5-ethyl-5-neopentylbarbituric acid*

If in Example 7 the methanol is replaced by ethyl alcohol, 130 g. of 5-ethyl-5-neopentylbarbituric acid, B.P. 195° C. are obtained.

*Example 9.—5-ethyl-5-neopentyl-2-thiobarbituric acid*

If in Example 7 sodium is replaced by 132 g. of potassium and the urea by 132 g. of thiourea, 130 g. of 5-ethyl-5-neopentyl-2-thiobarbituric acid, B.P. 176° C. are obtained.

*Example 10.—5-allyl-5-neopentylbarbituric acid*

If in Example 1 the neopentylmalonic acid diethyl ester is replaced by 270 g. of allyl-neopentylmalonic ester, 130 g. of 5-allyl-5-neopentylbarbituric acid, B.P. 155-157° C. are obtained after recrystallization from 50% methanol.

*Example 11.—5-allyl-5-neopentylbarbituric acid*

If in Example 3 the neopentylmalonic acid diethyl ester is replaced by 270 g. of allyl-neopentylmalonic ester, and the precipitated iminobarbituric acid is boiled with 20% hydrochloric acid for 12 hours, 178 g. of 5-allyl-5-neopentylbarbituric acid, B.P. 155-157° C., after recrystallization from 50% methanol, are obtained.

*Example 12.—5-allyl-5-neopentylbarbituric acid*

If in Example 10 the methanol is replaced by isopropyl alcohol, 120 g. of 5-allyl-5-neopentylbarbituric acid, B.P. 155-157° C. are obtained.

*Example 13.—5-allyl-5-neopentyl-2-thiobarbituric acid*

If in Example 10 the urea is replaced by 132 g. of thiourea, and the amount of sodium is increased to 78 g., 174 g. of 5-allyl-5-neopentyl-2-thiobarbituric acid, B.P. 198° C. are obtained after recrystallization from 75% methanol.

*Example 14.—5-ethyl-5-(β,β-dimethylbutyl)barbituric acid*

If in Example 11 the allyl-neopentylmalonic ester is replaced by 272 g. of ethyl (β,β-dimethylbutyl) malonic acid diethyl ester, 152 g. of 5-ethyl-5-(β,β-dimethylbutyl) barbituric acid, B.P. 180° C. are obtained.

*Example 15.—5-allyl-5-(β,β-dimethylbutyl)barbituric acid*

If in Example 1 the neopentylmalonic acid diethyl ester is replaced by 284 g. of allyl (β,β-dimethylbutyl)-malonic acid ethylester, 90 g. 5-allyl-5-(β,β-dimethylbutyl)barbituric acid, B.P. 140° C. are obtained.

*Example 16.—5-allyl-5(β,β-dimethylbutyl)barbituric acid*

If in Example 11 the allyl neopentylmalonic ester is replaced by 284 g. of allyl-(β,β-dimethylbutyl)-malonic acid diethyl ester, 125 g. of 5-allyl-5-(β,β-dimethylbutyl) barbituric acid, B.P. 140° C. are obtained.

*Example 17.—5-allyl-5-(β,β-dimethyl)-2-thiobarbituric acid*

If in Example 15 the urea is replaced by 97 g. of thiourea, 135 g. of 5-allyl-5-(β,β-dimethylbutyl)-2-thiobarbituric acid, B.P. 143° C. are obtained.

*Example 18.—5-allyl-5-(β,β-dimethylamyl)barbituric acid*

If in Example 3 the neopentylmalonic acid is replaced by an equivalent amount of allyl-(β,β-dimethylamyl)-malonic diethyl ester, 5-allyl-5-(β,β-dimethylamyl)-2-iminobarbituric acid is obtained. This may be converted to 5-allyl-5-(β,β-dimethylamyl)-barbituric acid by boiling with 20% hydrochloric acid for 12 hours.

*Example 19.—Sodium salts*

The sodium salts of the barbituric acids prepared according to Examples 1–18 may be produced by dissolving 25 g. of sodium in 350 parts of absolute methanol in a vessel provided with reflux condenser and adding a solution of 1 mol of the corresponding barbituric acid in the least possible amount of methanol thereto. The solution (or in certain cases the mixture) so obtained is concentrated in vacuum while heating on a water bath, 200 ml. dry benzene is added and the mixture is again concentrated to complete dryness, at the end under the least possible pressure (1–2 mm./Hg) and with heating on a boiling water bath. The yield is practically quantitative.

There has thus been described a process for producing novel substituted barbituric acids. The disclosure should be construed as exemplary and illustrative only, referring to the preferred practice of the invention. Other similar reactions, within the scope of the following claim, and employing this reaction mechanism, will readily occur to those skilled in the art.

What I claim is:

As a new chemical compound, 5-neopentyl-5-allyl barbituric acid having the formula:

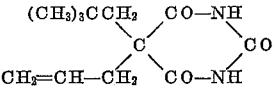

and its alkali-metal non-toxic salts.

References Cited in the file of this patent
UNITED STATES PATENTS
2,161,212    Whitmore et al. _____ June 6, 1939

OTHER REFERENCES

Dix et al.: Jour. Amer. Chem. Soc., vol. 58, pp. 731–732 (1936).

Bush et al.: J. Am. Chem. Soc., vol. 75, pp. 2949–51 (1953).